H. W. LEONARD.
MEANS FOR AUTOMATICALLY CONTROLLING ELECTRIC MOTORS.
APPLICATION FILED NOV. 7, 1907.
960,971.  Patented June 7, 1910.
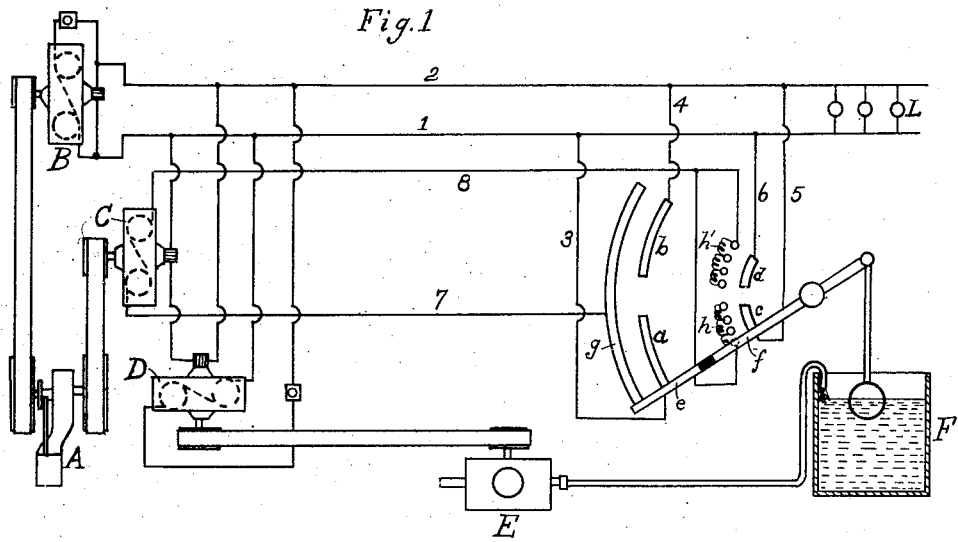
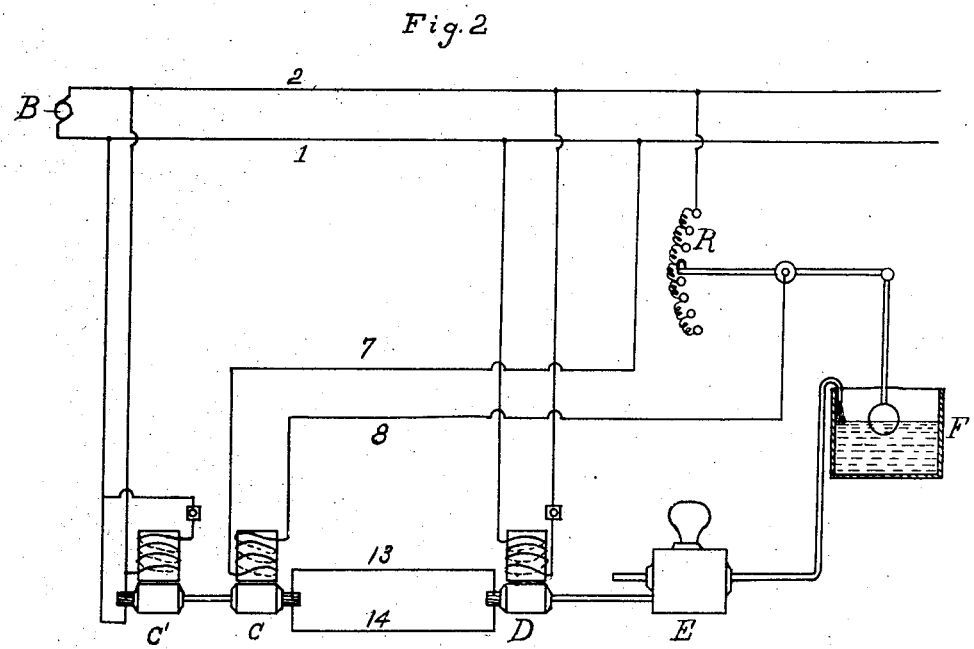
WITNESSES
*H. Ward Leonard* INVENTOR
BY
*Edwards, Sager & Wooster*
his ATTORNEYS.

UNITED STATES PATENT OFFICE.

HARRY WARD LEONARD, OF BRONXVILLE, NEW YORK.

MEANS FOR AUTOMATICALLY CONTROLLING ELECTRIC MOTORS.

960,971. Specification of Letters Patent. Patented June 7, 1910.

Original application filed February 6, 1897, Serial No. 622,269. Divided and application filed January 28, 1902, Serial No. 91,577. Divided and this application filed November 7, 1907. Serial No. 401,055.

*To all whom it may concern:*

Be it known that I, HARRY WARD LEONARD, a citizen of the United States, residing at Bronxville, in the county of Westchester and State of New York, have invented certain new and useful Improvements in Means for Automatically Controlling Electric Motors, of which the following is a full, clear, and exact specification.

The present application is a division of my pending application filed January 28, 1902, Serial No. 91577, and renewed July 10, 1905, Serial No. 269132, and which was divided from my original application Serial No. 622269, filed February 6, 1897, which resulted in Patent No. 717,584, granted January 6, 1903.

My invention relates to the control of electric motors and especially to the automatic control of electric motors in such a way that the motor will automatically operate to do just the amount of work required of it. As illustrative, it may be said that it is frequently important that a pump be operated so as to maintain a certain level of water as in the draining of mines. The amount of water flowing into the mine is of course variable and beyond control. By my invention an electric motor operating a pump will automatically pump at just the speed required to maintain the level of the water constant regardless of the rate of inflow or outflow.

In a water supply system it is important that the pumping machinery shall maintain a constant pressure on the mains, and in the use of compressed air, it is desirable that the air shall be maintained at a constant pressure independent of the demand. By my invention this is automatically accomplished in a very simple manner.

In the operation of certain machinery, it is desirable that means be provided which will automatically protect the same from being exposed to excessive strains. This can be readily accomplished by the use of my invention. For example, a hoisting apparatus can be automatically stopped by my invention at a safe limiting position when it might otherwise be driven beyond its safe limit of travel.

My invention is also applicable to the operation from a source of power having a tolerably constant amount of energy at a tolerably constant speed, of machinery the torque element of the power of which may vary very widely, such as hoists, pumps, locomotives, etc.

With my invention I may use a prime motor not very steady as to speed and secure constant speed at final motor by driving a centrifugal governor by the final motor which governor will be the automatic regulator.

In carrying my invention into effect I sometimes employ any well known form of automatic device, such as a float, a centrifugal governor, a diaphragm or plunger operated by air, gas or water etc., to adjust a rheostat connected in the field circuit of a dynamo electric machine, which supplies a part or all of the energy for the working motor to be controlled, that is to say, instead of regulating the working motor directly, I regulate its source of energy. In other words, I automatically cause to be varied the net effective volts delivered to the working motor to such a voltage as will operate the motor at the speed required.

Certain forms of my invention are illustrated in the accompanying drawings, in which—

Figure 1 is a diagrammatic view illustrating my invention applied to a pumping system; and Fig. 2 is a similar view of another modification of my arrangement applied to a pumping system.

Referring to Fig. 1 of the drawings in which my invention is applied to a pumping system operating in conjunction with an isolated lighting plant, A indicates a steam engine or other prime mover driving dynamo electric machines B and C. Conductors 1 and 2 extend from the machine B, between which are connected incandescent electric lamps L. The armature of the dynamo C is connected across the circuit 1—2 in series with the armature of a working motor D. The dynamo C has a separately excited, variable and reversible field connected across the circuit 1—2 through an automatic reversing rheostat, the details of which will be hereinafter referred to. The field circuit of the working motor D is a practically constant one connected across the circuit 1—2. Thus it will be seen that by connecting the armature of the working motor across the circuit 1—2 in series with a dynamo whose field is variable and reversible, the working motor may be operated at any speed from zero to a speed due to the sum of the electromotive forces of machines B and C, the electromotive forces of said machines being practically equal. That is to say, if the machines B and C are both 100-volt machines and both are producing their maximum electromotive force, and if the electromotive force of machine C is counter to that of machine B, the working motor will receive no energy and will remain at rest. Now if the field of C be weakened, thus reducing the electromotive force produced by that machine, the working motor will receive energy due to the difference between the electromotive forces of B and C. The energy so delivered to the working motor may be increased by decreasing the strength of the field of machine C until that machine is producing practically no electromotive force, and then by reversing the field of that machine, it will generate an electromotive force in the same direction as that of machine B, and the working motor will receive an electromotive force equal to the sum of the electromotive forces of machines B and C, and this electromotive force can be further increased by increasing the strength of the field of machine C, thus increasing the electromotive force produced thereby, and increasing the speed of the working motor, until the working motor receives the full electromotive force of the machines B and C.

The working motor drives a pump E whose outlet leads to a reservoir F, the water in which must be maintained at a certain level. A float in the reservoir may be employed to automatically control the reversing rheostat for the dynamo C, which rheostat may be of any desirable form. As shown, it comprises contact plates $a$ and $b$, from which extend conductors 3 and 4, respectively, to the conductors 1, 2; contact-plates $c$ and $d$ also connected with conductors 1, 2 by wires 5 and 6 respectively; a pivoted contact-arm connected with the float and having two conducting surfaces $e$ and $f$ insulated from each other; a contact-plate $g$ and resistances $h$ and $h'$ connected with the conductors 7 and 8 respectively, which extend from the field magnet coils of machine C. The position of the float and the automatic rheostat shown is one when the water in the reservoir is at the maximum level, that is, the entire resistance $h$ is out of the field circuit of machine C, which machine then has a strong field and is generating its maximum electromotive force, and assuming that this electromotive force is equal and opposite to that of machine B, the working motor will receive no energy. When the water in the reservoir falls below the maximum level, the float descends and moves the contact-plates $e$ and $f$ upward, inserting a resistance in the field circuit of the machine C, thus weakening the field of that machine and gradually reducing its electromotive force, and hence the armature of the working motor will receive an amount of energy from the main line 1—2 due to the difference between the electromotive forces produced by the machines B and C. If the float continues to descend, the contact-arms $e$ and $f$ will continue to rise, inserting more resistance in the field circuit of machine C and hence increasing the energy delivered to the working motor. If the water in the reservoir falls low enough to cause the float to carry the contacts $e$ and $f$ beyond the horizontal line, so that the plate $e$ will bridge the plates $g$ and $b$, and the plate $f$ will bridge the resistance $h'$ and plate $d$, the field circuit of the machine C will be reversed, but with a weak field, so that a small electromotive force will be generated by machine C in the same direction as that from the machine B; thus the armature of the working motor will receive an amount of energy due to the sum of the electromotive forces of the machines B and C and which amount of energy can be increased by strengthening the field of machine C. Thus it will be seen that the speed of the motor D may be gradually and automatically increased according to the fall of the water in the reservoir, and when the water in the reservoir begins to rise, the reverse action will take place and continue until the water reaches the maximum level, when the automatic rheostat will be again in its limiting position and the working motor will receive no energy. It will also be seen that the position of the controlling means will adjust itself to cause the motor to operate at a speed corresponding with the demand upon it; for example, if the water is drawn from the tank at a certain rate, then the controlling means will be automatically adjusted to cause the motor to operate at a practically fixed speed corresponding to the required rate of flow of the water. It will also be noted that machine C acts as a motor when its electromotive force opposes and is less than that of the supply and act as a generator when its electromotive force acts with that of the supply.

In Fig. 2, which shows another modification of my invention, the dynamo C is driven by a motor C' instead of by the prime mover as in Fig. 1. The motor C' may be a shunt wound motor connected across the circuit 1—2. The armatures of the machine C and working motor D are in a local circuit 13—14. By this arrangement the armature of the working motor receives energy only from the machine C. The field coils of the machine C are connected by wires 7, 8 across the main circuit 1—2 through a simple rheostat R controlled automatically by a float in a reservoir F, as in Fig. 1. The contact lever of the rheostat is at an intermediate position and the motor D is operating at an intermediate speed.

It will be understood that the field strength of the motors C' and D and generator B may be adjusted to any desired constant value by means of the rheostat in the field winding indicated on the drawings.

By employing 2 dynamos as the source of electric energy, I am able in certain instances to use relatively smaller size dynamos, and I secure other advantages accruing by dividing the source into separate parts, as will be readily understood.

It will be understood that my invention may be embodied in various forms of construction, and that I am limited in the scope thereof only as indicated by the following claims.

Having thus described my invention, I declare that what I claim as new and desire to secure by Letters Patent is:

1. The combination of two dynamo electric machines having armatures mechanically connected together, at least one of said machines having a field winding energized by a current different from its armature current, a common driving means for said armatures, an electric motor having a winding connected with both of said armatures, and means for automatically varying the voltage of one of said two armatures relatively to the other for controlling the energy supplied to said motor winding.

2. The combination of two mechanically and electrically connected electromotive force producing windings, an energy absorbing device electrically connected thereto, and means for automatically controlling, independently of the strength of the current through the device, the voltage of the energy supplied by said electromotive force producing windings to said energy absorbing device.

3. The combination of two mechanically connected electromotive force producing windings electrically connected in series with each other, an energy absorbing device electrically connected in series with said first-named windings, and means comprising an automatically adjusted rheostat for automatically varying the resultant electromotive force of said windings for controlling the energy absorbed by the device.

4. The combination of two dynamo electric machines, a common driving means therefor, a field winding of one of said machines being excited independently of its armature current, means for automatically varying the current in said winding for varying the electromotive force, and a translating device supplied with energy from the armatures of said machines.

5. The combination of two mechanically and electrically connected electromotive force producing windings, a counter electromotive force producing winding supplied with energy therefrom and requiring in operation variable voltage impressed at its terminals, and means for automatically controlling the energy supplied to said counter electromotive force producing winding.

6. The combination of two dynamo electric machines, a common driving means therefor, an electric motor, at least one of the windings of said motor being connected in a circuit containing the armatures of said machines connected in series with each other, and means for automatically varying the relative electromotive forces of said machines for controlling the speed of the motor.

7. The combination of two mechanically and electrically connected electromotive force producing windings, a translating device, requiring in operation variable current strength and variable voltage, connected therewith, and means for automatically controlling the electromotive force of at least one of said electromotive force producing windings for automatically controlling the operation of said translating device.

8. The combination of two dynamo electric machines, at least one of said machines having a field winding energized by a current different from its armature current, a common means for driving said machines, a third dynamo electric machine, at least one of the elemental windings of said third machine being connected in a circuit containing the armatures of said two machines connected in series with each other, and means for automatically varying the combined electromotive force of said two machines for controlling the third machine.

9. The combination of two dynamo electric generators having their armatures connected in series with each other, at least one of said generators having a separately excited field winding, a common driving means therefor, and means for automatically varying the joint electromotive force across said two armatures.

10. The combination of two dynamo electric machines, a prime mover for driving said machines, an electric motor, at least one of the windings of said motor being connected in a circuit containing the electromotive force producing elements of said machines in series with each other, and means for automatically varying the combined electromotive force and the current of said two machines for controlling the motor.

11. The combination of three dynamo electric machines, means for connecting the armatures of said machines all in series with each other, means for maintaining the speed of two of said machines fixed relatively to each other, and means for automatically varying the combined electromotive force the current strength of the armatures said two machines for varying the mechanical work done by the third machine.

12. The combination of an electric motor, a pump driven thereby, and means for automatically controlling the performance of the motor and pump independently of a change in ohmic resistance of the motor armature circuit comprising a rheostat and a movable element automatically movable in response to the action of the fluid pumped for automatically moving the movable element of said rheostat.

13. The combination of two electromotive force producing windings mechanically connected together, an electric device requiring in operation variable voltage supplied with energy therefrom, and automatic means for varying the electromotive force of at least one of said windings for varying the voltage impressed upon said device.

14. The combination of a prime mover, a direct current dynamo electric machine driven thereby, said machine having a separately excited field winding, and remote control means for automatically varying the current in said field winding for varying the electromotive force of said machine.

15. The combination of a prime mover, a direct current dynamo electric machine driven thereby, said machine having a separately excited field winding, remote control means for automatically varying the current in said field winding for varying the electromotive force of said machine, and an electric motor having at least one element thereof supplied with the variable electromotive force of said machine.

16. The combination of a prime mover, a dynamo electric machine driven thereby, said machine having a separately excited field winding, a dynamo electric machine for supplying current to said first machine, an electric motor having its armature connected in series with the armature of said first machine, and means for automatically varying the current in said field winding for automatically varying the electromotive force of said first machine and thereby automatically varying the speed of the motor.

17. The combination of a dynamo electric machine, a prime source of power for driving said machine, a source of electromotive force supplying current to a field winding of said machine, an electric motor having at least one of its elemental windings connected in series with the armature of said machine, and means for automatically varying the current in said field winding and thereby varying the speed of the motor.

18. The combination of a prime mover, a dynamo electric machine driven thereby and having a separately excited field winding, a second dynamo electric machine driven by said prime mover and which supplies current to said field winding, a motor having at least one of its elemental windings connected in series with the armature of said first-named machine, and means for automatically varying the speed of the motor.

19. The combination of a prime mover, a dynamo electric machine driven thereby and having a separately excited field winding, a second dynamo electric machine driven by said prime mover and which supplies current to said field winding, a motor having at least one of its elemental windings connected in series with the armature of said first-named machine, and means for automatically controlling the electromotive force of said first-named machine.

20. The combination of a source of electromotive force, an electric motor supplied with energy therefrom, a pump driven by said motor, a rheostat having a movable element for varying the electromotive force of said source, and means for causing said element to respond directly to the condition of the fluid pumped.

21. The combination of an electric motor, two mechanically and electrically connected electromotive force producing windings for jointly controlling the energy in at least one of the elemental windings of the motor, and means comprising a field winding energized by a current other than that in said motor winding for automatically controlling the joint effect of said two windings for controlling the motor.

22. The combination of two mechanically connected electromotive force producing windings, a translating device controlled thereby, and means for automatically reversing the electromotive force of one of said windings relatively to that of the other.

23. The combination of an electric motor, a mechanism driven thereby, and means for supplying variable voltage energy to at least one of the motor windings, said means comprising two mechanically connected electromotive force producing windings.

24. The combination of an electric motor, a pump driven thereby, two mechanically connected electromotive force producing windings for jointly controlling the energy supplied to at least one of the motor windings, and means controlled by the condition of the fluid pumped for automatically controlling said motor.

25. The method of controlling the work performed by an electric motor which consists in generating two electromotive forces in series with each other and with the counter-electromotive force producing element of the motor, and automatically varying at least one of the said two electromotive forces in response to changes in the demand of the work to be performed by the motor.

26. The method of controlling the work performed by an electric motor which consists in generating two electromotive forces in series with the armature of the motor, and automatically varying the resultant of the said two electromotive forces in response to changes in the demand of the work to be performed by the motor.

27. The method of varying the voltage impressed upon a circuit containing a translating device for controlling the flow of a fluid, which comprises generating dynamically two voltages in series with each other, driving said generators at same speed, supplying said voltages to the translating device, and automatically varying one of said voltages between a negative value and a positive value in response to changes in the condition of the fluid.

28. The combination comprising two dynamos, common means for driving the same, a motor having its winding connected to the armatures of said dynamos, means operated by said motor for impelling the flow of a fluid, and a device responsive to changes in the condition of the fluid for varying the voltage impressed on said motor winding.

29. The combination of two dynamo electric armatures, common means for driving said armatures, an electric motor winding in series with said armatures, a variable speed mechanism embodying a fluid, said speed mechanism being operated by said motor, and means automatically operated by the fluid for varying the voltage impressed on said motor winding, thus regulating said motor.

30. The method of automatically starting a motor employed for controlling the flow of a fluid, which comprises generating a plurality of voltages by driving a plurality of dynamos by a common means, supplying the resultant voltage to the armature of the motor, and causing the fluid to automatically change said resultant from zero.

31. The method of pumping a fluid by means of an electric device, which comprises generating dynamically electric energy, impressing said energy upon a winding of said device, regulating the voltage of the electric energy by a rheostat, and causing the fluid to directly control the rheostat, thus automatically controlling the rate of pumping.

32. The method of automatically controlling a motor employed for impelling the flow of a liquid, which comprises energizing the field winding and the armature winding of the motor by independent currents, disposing a third circuit in electromagnetic relation to the armature circuit, arranging a voltage controlling device in the third circuit, controlling the current in said armature circuit by causing the liquid to directly operate said device.

33. The method of controlling an electric motor, which comprises driving two dynamos by a common means, collecting the generated energy, distributing said energy in three circuits, energizing the field winding of said motor by one of said circuits, energizing the armature winding by a second of said circuits, and controlling the energy in said second circuit by the energy of the third of said circuits.

34. The method of regulating a motor, which comprises driving two sources by a common means, collecting the electric energy generated, distributing said energy in three circuits in parallel with each other, energizing the field winding of said motor by one of said circuits, energizing the armature winding by a second of said circuits, controlling the energy in said second circuit by the energy in the third of said circuits, and controlling the energy in the third of said circuits by the work done by the motor, thus automatically controlling the energy in the motor circuit by the work done by the motor and independently of the current in the field winding of said motor.

In testimony whereof I affix my signature, in presence of two witnesses.

HARRY WARD LEONARD.

Witnesses:
B. E. SMYTHE,
C. J. CORNELL.